United States Patent
Bandat et al.

(10) Patent No.: US 6,816,902 B1
(45) Date of Patent: Nov. 9, 2004

(54) METHOD AND SYSTEM FOR IMPROVING WORKFLOW PERFORMANCE IN WORKFLOW APPLICATION SYSTEMS

(75) Inventors: Kurt Bandat, Vienna (AT); Heidemarie Wernhart-Zinecker, Vienna (AT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/452,254

(22) Filed: Dec. 1, 1999

(30) Foreign Application Priority Data

Dec. 1, 1998 (EP) ............................................ 98122766

(51) Int. Cl.[7] .............................................. G06F 15/173
(52) U.S. Cl. ........................ 709/226; 709/105; 709/332
(58) Field of Search .................. 705/4, 7, 8; 707/104.1; 709/226, 105, 332; 717/102

(56) References Cited

U.S. PATENT DOCUMENTS

| | | | | |
|---|---|---|---|---|
| 5,680,548 A | * | 10/1997 | Trugman | 709/226 |
| 5,819,022 A | * | 10/1998 | Bandat | 714/16 |
| 5,828,866 A | * | 10/1998 | Hao et al. | 703/7 |
| 5,960,404 A | * | 9/1999 | Chaar et al. | 705/8 |
| 6,023,702 A | * | 2/2000 | Leisten et al. | 707/100 |
| 6,338,074 B1 | * | 1/2002 | Poindexter et al. | 707/500 |
| 6,341,351 B1 | * | 1/2002 | Muralidhran et al. | 713/201 |
| 6,397,191 B1 | * | 5/2002 | Notani et al. | 705/9 |

FOREIGN PATENT DOCUMENTS

EP  778535 A  *  5/1998 ............. G06F/9/44

OTHER PUBLICATIONS

Singh et al., "A Template–Based Approach to the Generation of Distributed Applications Using a Network of Workstations," IEEE Transactions on Parallel and Distributed Systems, vol. 2, No. 1, Jan. 1991.*

Kwan, M. Millie & P. R. Malasubramanian. "Adding Workflow Analysis Techniques to the IS Development Toolkit." Proceedings of the Thirty–First Hawaii International Conference on System Sciences, vol. 4, pp. 312–321, Jan. 6–9, 1998.*

* cited by examiner

Primary Examiner—Susanna M. Diaz
(74) Attorney, Agent, or Firm—Scully, Scott, Murphy & Presser; Gail H. Zarick

(57) ABSTRACT

The invention identifies areas in a workflow graph that operate on one workstation—islands that can execute also remote from a central workflow server. Such a remote workstation can even operate physically disconnected from a central server during the interpretation/execution of the island. The workflow model is analyzed and those parts that are defined for execution on one specific workstation are encapsulated. Those parts, called "islands" can be interpreted or executed on the central workflow server, or can be downloaded from the server to a specific remote client workstation. Additionally, the islands in the workflow graph can optionally be transformed, either at the server or after downloading at the destination workstations, towards much more efficiently executable versions of the islands.

10 Claims, 7 Drawing Sheets

Work on Claims

Client name： Smith ▽

Policy number： CAR3789 ▽

Claim number： ACCIDENT13 ▽

Close  ⊙          Help  ⊙

FIG. 5

METHOD AND SYSTEM FOR IMPROVING WORKFLOW PERFORMANCE IN WORKFLOW APPLICATION SYSTEMS

BACKGROUND OF THE INVENTION

1. Technical Field

The present invention relates to method and system for improving workflow performance in workflow application systems, and particularly to method and system for reducing interpretation overhead in such systems.

2. Background Art

A new area of technology with increasing importance is the domain of workflow-Management-Systems (WFMS). WFMS support the modeling and execution of business processes. Business processes control which piece of work of a network of pieces of work will be performed by whom and which resources are exploited for this work, i.e. a business process describes how an enterprise will achieve its business goals. The individual pieces of work might be distributed across a multitude of different computer systems connected by some type of communication network.

The process of designing, developing and manufacturing a new product and the process of changing or adapting an existing product presents many challenges to product managers and engineers to bring the product to market for the least cost and within schedule while maintaining or even increasing product quality. Many companies are realizing that the conventional product design process is not satisfactory to meet these needs. They require early involvement of manufacturing engineering, cost engineering, logistic planning, procurement, manufacturing, service and support with the design effort. Furthermore, they require planning and control of product data through design, release, and manufacturing.

The correct and efficient execution of business processes within a company, e. g. development or production processes, is of enormous importance for a company and has significant influence on company's overall success in the market place. Therefore, those processes have to be regarded similar as technology processes and have to be tested, optimized and monitored. The management of such processes is usually performed and supported by a computer based process or workflow management system.

In D. J. Spoon: "Project Management Environment", IBM Technical Disclosure Bulletin, Vol. 32, No. 9A, February 1990, pages 250 to 254, a process management environment is described including an operating environment, data elements, and application functions and processes.

In R. T. Marshak: "IBM's FlowMark, Object-Oriented Workflow for Mission-Critical Applications", Workgroup Computing Report (USA), Vol. 17, No. 5, 1994, page 3 to 13, the object character of IBM FlowMark as a client/server product built on a true object model that is targeted for mission-critical production process application development and deployment is described.

In H. A. Inniss and J. H. Sheridan: "Workflow Management Based on an Object-Oriented Paradigm", IBM Technical Disclosure Bulletin, Vol. 37, No. 3, March 1994, page 185, other aspects of object-oriented modeling on customization and changes are described. In F. Leymann and D. Roller: "Business Process Management with FlowMark", Digest of papers, Cat. No. 94CH3414-0, Spring COMPCON 94, 1994, pages 230 to 234, the state-of-the-art computer process management tool IBM FlowMark is described. The meta model of IBM FlowMark is presented as well as the implementation of IBM FlowMark. The possibilities of IBM FlowMark for modeling of business processes as well as their execution are discussed. The product IBM FlowMark is available for different computer platforms and documentation for IBM FlowMark is available in every IBM branch.

In F. Leymann: "A meta model to support the modeling and execution of processes", Proceedings of the 11th European Meeting on Cybernetics and System Research EMCR92, Vienna, Austria, Apr. 21 to 24, 1992, World Scientific 1992, pages 287 to 294, a meta model for controlling business processes is presented and discussed in detail.

The "IBM FlowMark for OS/2", document number GH 19-8215-01, IBM Corporation, 1994, available in every IBM sales office, represents a typical modern, sophisticated, and powerful workflow management system. It supports the modeling of business processes as a network of activities; refer for instance to "Modeling Workflow", document number SH 19-8241, IBM Corporation, 1996. As further information on Workflow Management Systems available in IBM sales offices one could mention: IBM MQSeries Concepts and Architecture, document number GH 12-6285; IBM MQSeries Getting Started with Buildtime, document number SH 12-6286; IBM MQSeries Getting Started with Runtime, document number SH 12-6287. This network of activities, the process model, is constructed as a directed, acyclic, weighted, colored graph. The nodes of the graph represent the activities or work items which are performed. The edges of the graph, the control connectors, describe the potential sequence of execution of the activities. Definition of the process graph is via the IBM FlowMark Definition Language (FDL) or the built-in graphical editor. The runtime component of the workflow manager interprets the process graph and distributes the execution of activities to the right person at the right place, e. g. by assigning tasks to a work list according to the respective person, wherein said work list is stored as digital data within said workflow or process management computer system.

In F. Leymann and W. Altenhuber: "Managing business processes as an information resource", IBM Systems Journal, Vol. 32 (2), 1994, the mathematical theory underlying the IBM FlowMark product is described.

In D. Roller: "Verifikation von Workflows in IBM FlowMark", in J. Becker und G. Vossen (Hrsg.): "Geschaeftsprozessmodellierung und Workflows", International Thompson Publishing, 1995, the requirement and possibility of the verification of workflows is described. Furthermore the feature of graphical animation for verification of the process logic is presented as it is implemented within the IBM FlowMark product.

For implementing a computer based process management system, firstly the business processes have to be analyzed and, as the result of this analysis, a process model has to be constructed as a network of activities corresponding to the business process. In the IBM FlowMark product, the process models are not transformed into an executable form. At run time, an instance of the process is created from the process model, called a process instance. This process instance is then interpreted dynamically by the IBM FlowMark product, which is resident in each user's computer participating in the workflow.

A concept often used in distributed application management is the so-called single server concept. Here, one server owns and controls the workflow of a particular business process. When many workstations are included in that process, the interpretative execution of the work flow models creates substantial interpretation and communication overhead that leads to a server overload and extensive response times for the application user.

The single server concept furthermore inhibits the possibility for workstations to temporarily work physically off-line from the central server and workflow model. This represents a show-stopper for those applications that require physically disconnected operation, both for non-stationary or mobile workstations, and in networks with unreliable communication links.

This type of application, however, corresponds more and more to a certain type of "modern times working" when a user uses its mobile computing device, e.g. a notebook for performing the part of the workflow he is associated with in the workflow.

But generally, a user always requires a quick response time in its workflow based application. Thus, in the typical case, when a complex communication takes place for graph interpretation between workstations and perhaps a plurality of servers and sub-servers too much time is spent for said communication during the execution time in relation to the amount of work which can complete during said communication.

Further, servers have been identified as performance bottlenecks when they interpret workflow graphs out of a workflow definition database, and currently the workstation capacity is often unexploited as generally in the last years the workstations computing power has increased more and more.

Thus, a requirement exists for reducing the work flow interpretation overhead and for balancing the workload between servers and workstations by improving the utilization and exploitation of workstation based resources in such systems.

It is thus a general object of the invention to provide a method and system for improving workflow in workflow management systems which improve the execution performance and response time for workflow based distributed applications.

It is a further object of the invention to provide such a method which enables a workstation for disconnected execution of portions of a workflow graph even when the server is down or the network connecting the workstation with the server is broken, or when the communication lines are not reliable.

It is a further object of the invention to provide such method which is able to be integrated with state-of-the-art workflow optimizing methods, such as e.g. compiling certain parts of a workflow.

SUMMARY OF THE INVENTION

The basic idea of the invention is to identify areas in a workflow graph that operate on one workstation—islands—that can optionally execute also remote from a central workflow server. Such a remote workstation can even operate physically disconnected from a central server during the interpretation/ execution of the island.

According to the invention the single workflow model, as today residing in one server, is firstly analyzed and those parts that are defined for execution on one specific workstation are encapsulated. Those parts, called "islands" can be interpreted or executed on the central workflow server, or can be downloaded from the server to a specific remote client workstation. Additionally, the islands in the workflow graph can optionally be transformed, either at the server or after downloading at the destination workstations, towards much more efficiently executable versions of the islands.

Even if an island is just interpreted or executed on the server in encapsulated form without being downloaded to a client, the island interpretation or execution is much more efficient due to its reduced size of the model, confined only to those parts that are relevant for the client, as compared to the interpretation of the original part of the workflow, representing an island before its encapsulation.

As an advantage, the reliability of operation in distributed application systems is improved, further, the communication between the central server and client workstations is reduced, and, all resources in a client/server configuration are utilized in a more balanced form.

Further, the method according to the invention allows for disconnected execution of an island on a workstation which is unreliably connected in the network by downloading the island, disconnecting the workstation from the network, performing the island activities on the workstation and then reconnecting the workstation with the network and handing over the performed work items to the server. Such an isolated form of island execution can be defined over workflow graphs that are enriched with geography attributes for activities.

Thus, performance in the execution of islands is improved, both on servers and in client workstations.

Further, the capability is achieved, to operate physically disconnected from a server while executing an island in a remote client workstation, and finally, the capability is achieved to control a disconnection or reconnection explicitly for establishing mobility for client workstations.

Islands are parts of the workflow which are best to be described with the help of a workflow graph. They are comprising connected sub-parts of a workflow graph according to the following rules:

An island is formed by an aggregation of activities associated with the same physical or logical location attributes.

All activities within an island are connected by control connectors.

Only one physical location can be associated with one logical location for the interpretation/ execution of the island.

Only such islands are executable for which one and only one end user or end user role has been assigned to the execution of all activities in the island.

Only such an aggregation forms an island that has one single entering control connector to the entry activity of the island, even if all other island conditions are met. An extension to multiple entry activities is feasible, but is not described in the current disclosure application, because it does principally not contribute to the basic idea of the present invention. Islands may have multiple incoming data connectors from predecessor activities in the workflow graph that all must originate from predecessor activities to the entry activity in the island, that means from activities that have terminated before the entry activity can be started.

Islands may have multiple outgoing data connectors.

An island must have one and may have many outgoing control connectors, each originating from an exit activity in the island.

Outgoing data connectors from an island may only lead to activities that are successor activities to all exit activities of an island, that means to activities that can only start when all exit activities of an island have terminated.

All data and control connectors within an island follow the normal rules for workflow graphs without islands.

Basically the detection and preparation of islands for disconnection can be performed according to the invention statically at workflow definition time by a workflow definition tool, or can be performed dynamically during workflow interpretation with a runtime module.

Generally, islands must be designed such that no control or data connectors can convey information into an island once its execution has started, and that no data or control connectors can convey information to the workflow graph outside the island before the execution of the island has been terminated.

Islands can also be optimized towards improved performance and response time characteristics for the end user of an island. Both inline interpretation/ execution on the server and interpretation/ execution of the downloaded encapsulated island on a remote client workstation are feasible.

The main benefit from the inventive concepts is the possibility to realize geographically distributed application systems in physical environments where distributed workstations can operate autonomously during the island interpretation/ execution, even if communication between remote workstations and a central server is unreliable or temporarily interrupted, in particular referring to workstations with geographic mobility, and in contexts of unreliable physical communication.

BRIEF DESCRIPTION OF THE DRAWINGS

Preferred embodiments of the present invention will now be described, by way of example only, with reference to the accompanying drawings in which:

FIG. 5 is a schematic sketch of a dialog window showing a dialog example for performing user activity.

DETAILED DESCRIPTION OF THE PREFERRED EMBODIMENTS OF THE INVENTION

Figure 1:
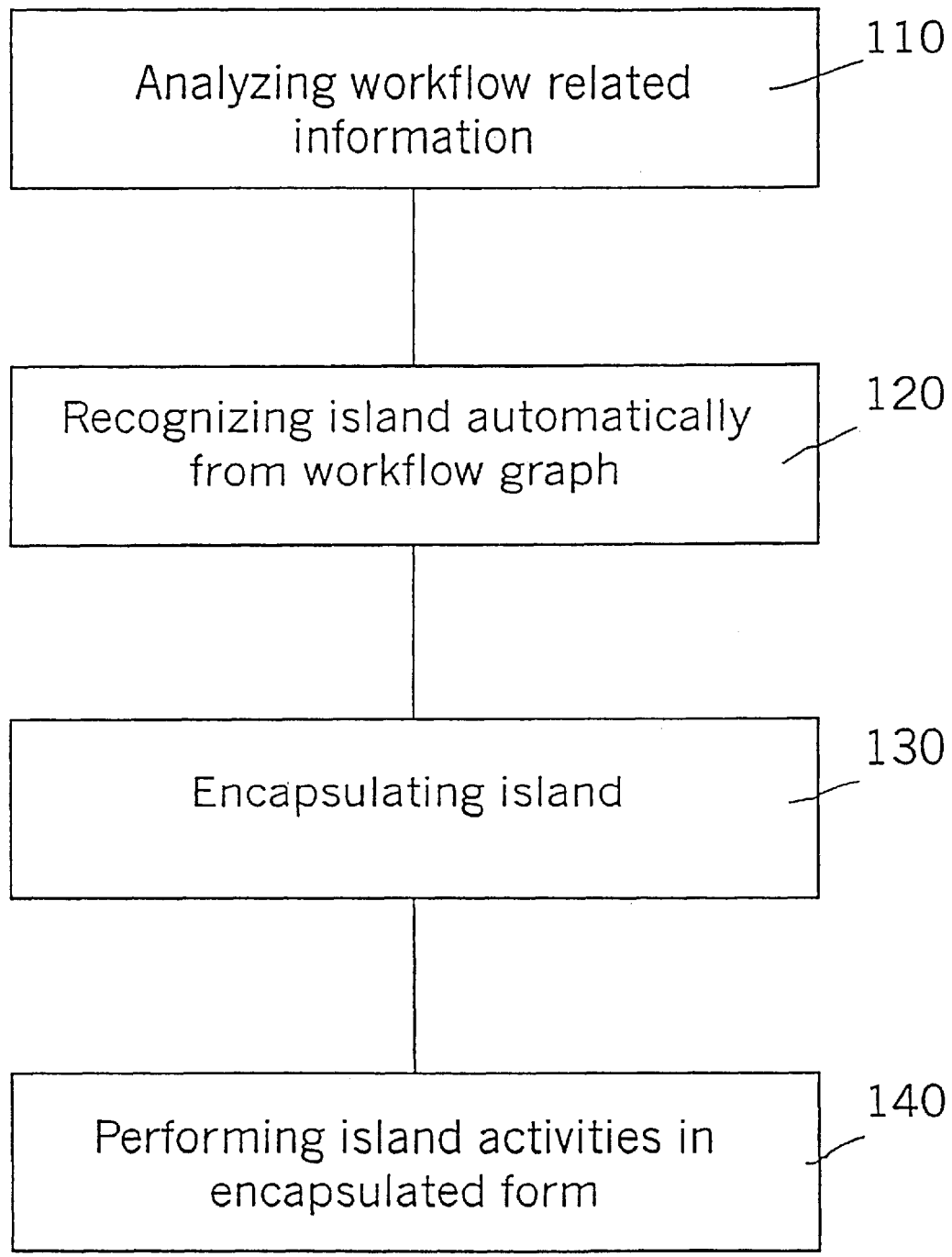
FIG. 1 is a schematic representation of a flow chart showing the essential steps of an embodiment of the method according to the invention.

With reference now to the Figures and special reference to FIGS. 1, 2, 3 and 4 a summarizing overview concerning the essential steps of the method according to the present invention is given first.

Workflow definitions are commonly represented as graphs 10, where business activities are placed in nodes 12 connected by control connectors 14 and data connectors 16. Nodes are generally depicted in the Figures as circles, the control connectors being depicted as full lines and the data connectors being depicted as broken lines in the FIGS. 2–4.

In such graphs activities usually are associated with certain attributes, such as the program to be executed for the activity, or the person assigned to executing the activity.

According to the inventive concept, the set of attributes for activities is extended to contain also a geography attribute that identifies the specific physical context and thus identifies the client workstation where the activity is to be executed.

Such a geography attribute can also be implied by the assignments of activities to persons, if throughout the workflow execution a person remains at one fixed physical location.

The so called 'islands' 17 are named objects derived from the workflow graph 10 and are comprising connected subparts of the workflow according to the rules mentioned above.

According to the present invention the workflow is improved by applying a sequence of steps, depicted in FIG. 1 and summarized herein after, as follows:

In a first step 110 islands are advantageously recognized by analyzing the workflow graph underlying the considered workflow. According to the invention an 'island analysis' function is defined, which supports the recognition of geographical islands in a given workflow graph that has been enriched with geographical activity attributes and which creates an 'island object' for an island recognized in the graph.

Said island object has one or more of the geographical information attributes: logical location name 18, physical location name 20 and user-id 22, where said user-id may either be a user-name or a user-role-name.

A logical location name attribute may be given to an activity when the physical location name for the eventual physical execution workstation is not yet assigned. A physical location name attribute may be assigned whenever the physical execution workstation becomes known. For an activity with assigned physical location name the logical location name is optional. Within a workflow graph that is subject to island analysis, all pairs formed by one specific logical location name and one physical location name must be identical. That means that assigning different physical location names to one and the same logical location name is not permitted in a well formed workflow graph, subject to island analysis and where applicable later physical location name assignment.

Each logical location name, or pair of logical and physical location name, can be associated with multiple islands in a workflow graph—see workstation A performing island A1 and island A2 thereafter.

Each island after successful island analysis must contain only such activities that are associated with one and the same user-id, that means user-name or user-role-name. Different user-id's may be assigned to islands that are all assigned to the same logical or pair of logical and physical location attributes. This implies that islands on one workstation can be executed consecutively by different user-names or user-roles, where one person may also act in different user roles.

The island object with an assigned physical location name contains the information where the island can be executed. Such assignment may also be triggered by a person with a user-name or acting in a user-role when requesting the execution of an island known to him on a workstation to which he is signed-on at the time.

The island object contains the information which can optionally be downloaded to a physical workstation where the island can be executed.

This modification of the inventive method is described in more detail in a further embodiment with reference to FIGS. 4–6 down below.

In a workflow graph containing geographical attributes, as described above, either at graph definition time or during attribute assignment, or during graph interpretation such parts can be identified that contain activities with identical logical location attributes or pairs of logical and physical location attributes. An isolation function must search through all activities in the graph for which either the logical geography allocation through a logical location name, or also a physical geography allocation through a physical location name has already been assigned. For each such attribute, or pair of attributes all those parts in the graph are to be detected, that are both associated with one and the same logical or pair of logical and physical attributes and where each part to be included in one and the same island is also assigned to one unique user-name or user-role-name. Furthermore all parts included into one island must obey all rules given above for the islands and their connectors. All these parts are then identified as islands, and respective island objects are created.

A user-id attribute, either specifying a user-name or a user-role-name must be given to each activity that becomes a candidate for inclusion in an island.

The graph analyzing function can be implemented either to work over an internal form of the workflow model or over an externalized format, as as e.g. in FlowMark given in the FlowMark definition language, or a similar externalized workflow model format.

Thus, as a result of the above analysis, islands can be recognized in a step 120 by extracting those activities having the same logical location name or pair of logical and physical location name, and are assigned to one and the same user-name or user-role-name.

Before an island can be interpreted inline in the server or downloaded to a workstation, the island must be "encapsulated" and placed in the island object. A logically defined workflow is not yet necessarily geographically positioned, and is not directly executable. Before an island in a workflow can be executed, the logical location name must thus be resolved into a physical location name. This resolution can be achieved explicitly by directly assigning a physical location to a logical location, obeying the rules given above, or implicitly by a user requesting the execution of an island known to him from a specific physical location.

In a next step 130 islands are encapsulated.

An analyzed and recognized island in a workflow graph has to be encapsulated before it can be interpreted or executed inline or be downloaded to a remote client workstation.

The encapsulating step 130 comprises to create for all incoming and outgoing control and data connectors some control ports 24 and data ports 26 that will serve as information buffers for the execution of the encapsulated island.

Such ports can be realized also within state-of-the-art workflow management systems as e.g. IBMs FlowMark product by a modification of the workflow graph, introducing additional island controlling activities for automatic execution that separate island interpretation or execution from the interpretation of the rest of the workflow graph. Said control ports 24, depicted in FIG. 3 and FIG. 4 of which for improved clarity of the drawings only some are provided with reference signs are temporary data holders for control data as they can occur on control connectors in a workflow graph.

The data ports 26 as well are correspondingly temporary data holders for communication data as they can occur on data connectors in a workflow graph.

The areas in the graph belonging to one island, are cut out, removed from the original workflow graph and are substituted by "encapsulated islands". This can be seen in FIG. 4, where the original plurality of nodes has disappeared. On all points, where control and data connectors enter the island or leave the island, control and data ports are created as ports of the island and corresponding shadow ports are created as parts of the original workflow graph. The control and data connectors originally leading to and from the activities in the island, are now connected to and from the control and data ports of the "encapsulated island" leading to the respective shadow control and data ports in the graph embedding the island.

In a last step 140 the island activities are performed in an encapsulated form. This can occur, once an island has been successfully encapsulated and the data and control ports and their corresponding shadows have been created and the input ports have been initialized. Then, the island can execute both inline on a central server without downloading or, optionally, the island can be downloaded to a remote client workstation, as described later on in a second, preferred embodiment of the present invention.

Both inline execution and downloaded execution are performed by an inventive "island interpreter" and have the same logical execution results for the workflow graph, since they are both based on the encapsulated version of the island.

Figure 2:
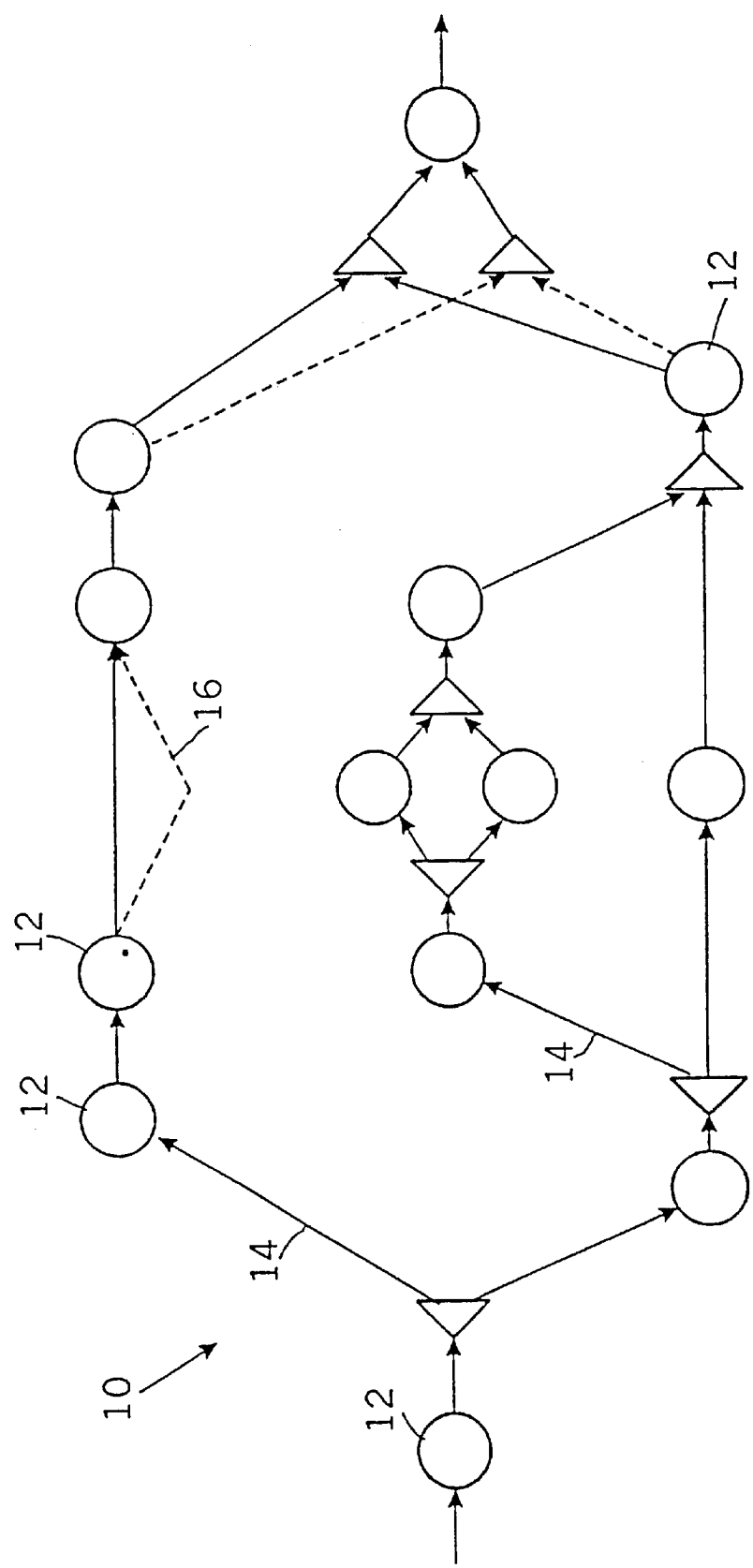
FIG. 2 is a schematic representation of a workflow graph showing a part of a particular workflow being object to the inventional method.
Figure 3:
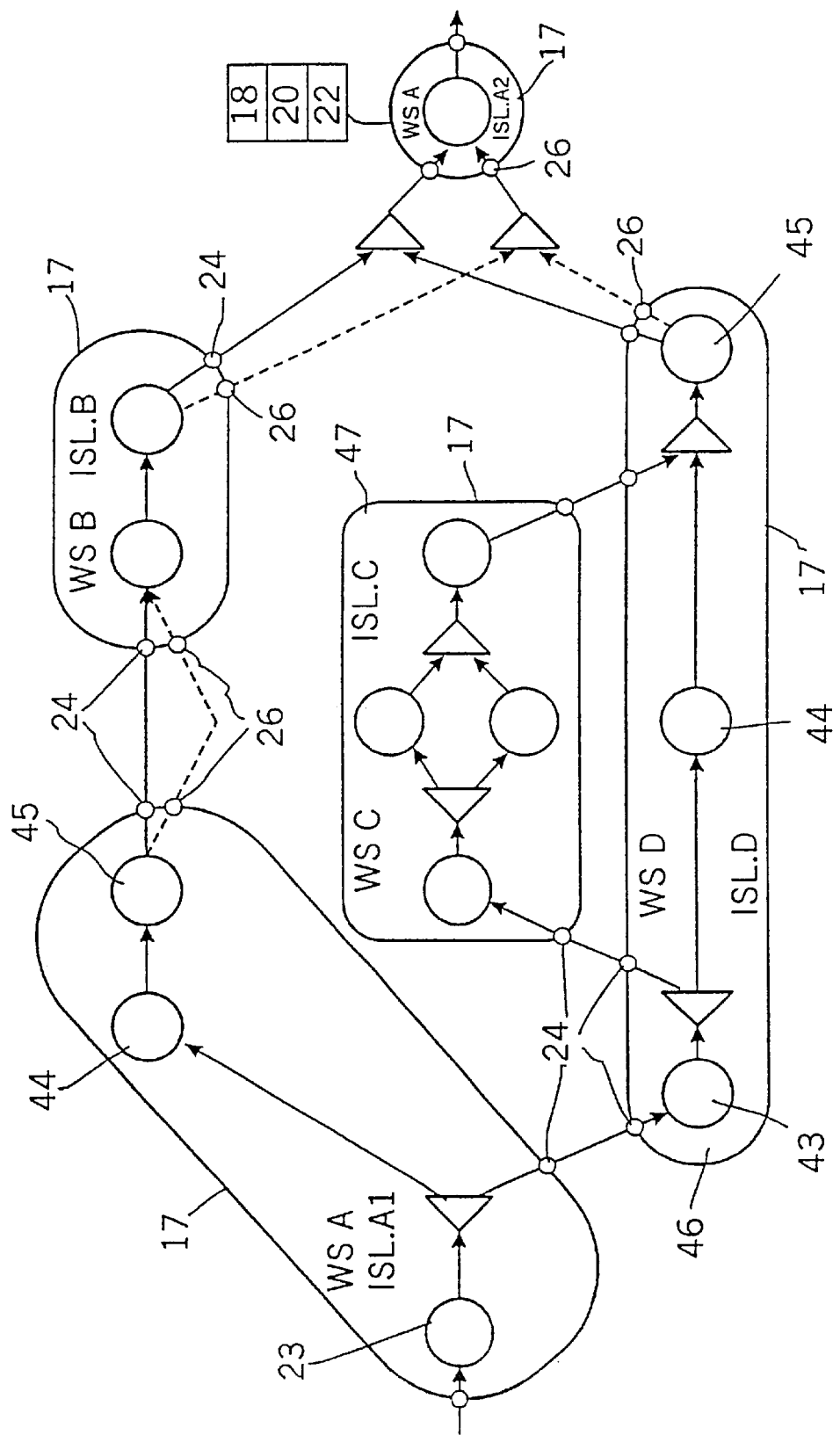
FIG. 3 is a schematic representation of th same part as shown in FIG. 2 with an overlying island structure.
Figure 4:
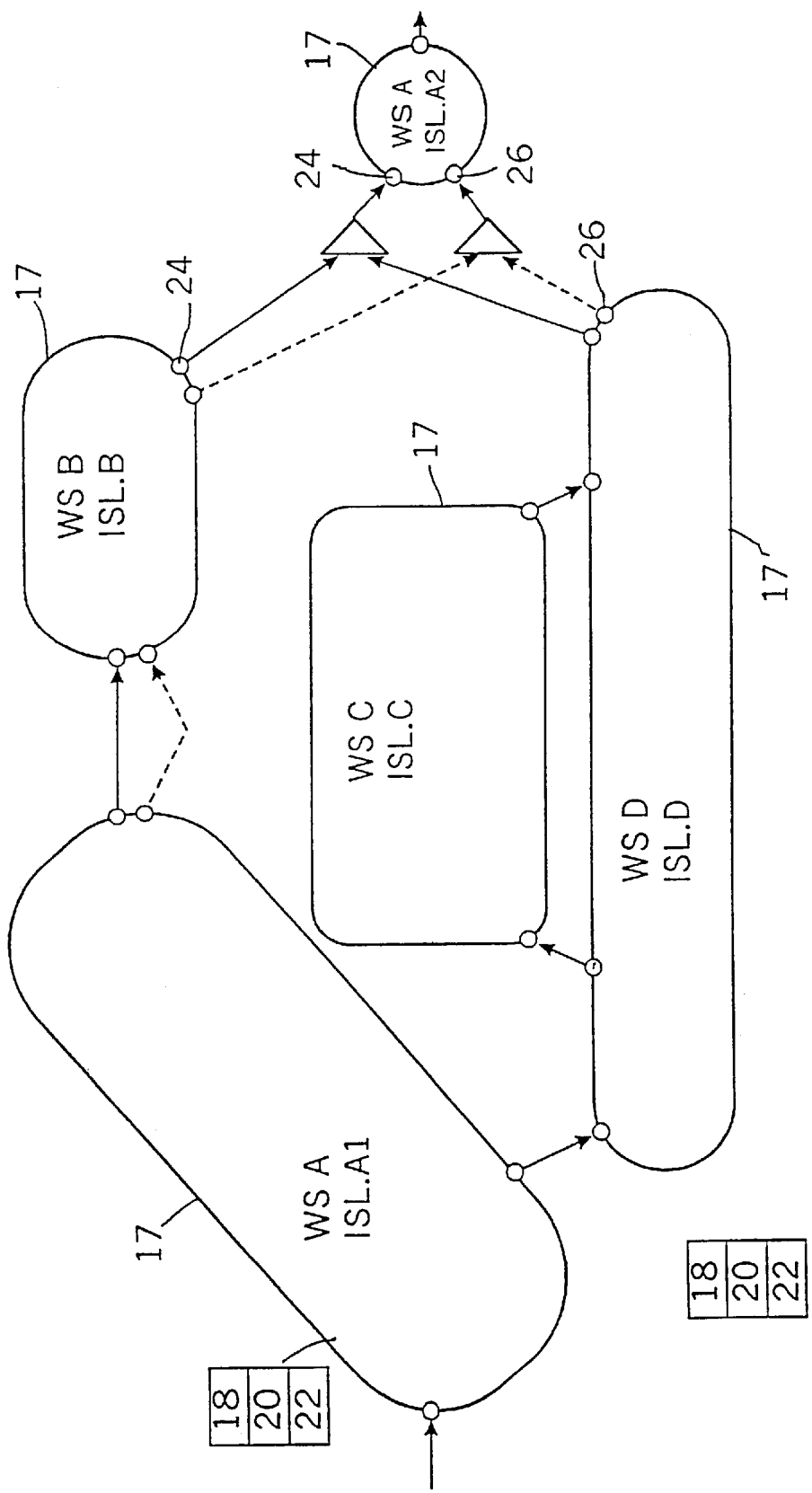
FIG. 4 is a schematic representation corresponding to FIG. 2 and FIG. 3 just showing the resulting outline of the island structures applied to the workflow part according to the invention.

As can be seen from a synopsis of FIGS. 2, 3 and 4, each island covers a certain area of the original workflow graph and replaces each a plurality of node activities which are—in view of the workflow owning server—seen as a generalized collection of those single activities, of which the island is consisting.

In a further modification of the first embodiment of the inventional method the body of the encapsulated islands can be optimized by any of the methods known in the state-of-the-art for improving the interpretation or execution of sub-parts of workflow graphs. Thus, the graph parts, the islands are consisting of, can be compiled, for example.

Next, a further, preferred embodiment of the method according to the present invention will be described in more detail. The inventional method is described by help of an example, which addresses a typical application scenario from the insurance industry, in which the agents of an insurance company have to work with their clients on insurance policies and insurance claims against such policies. Today, insurance agents often work at the client's remote home or office location. In such cases it is already quite customary that insurance agents employ workstations in form of personal or notebook computers for their work. The mode of operation for remote work is today still somehow uncomfortable. Working in a remote location, the agent has only two options: either he has to work on his workstation without any access to his central office location, or in the other case he can link through communication means to his central office and data base, but he has to operate under the performance and reliability restrictions of remote communication links, often experiencing insufficient performance or response time and unreliable or even interrupted data communication, as it was mentioned in the introducing chapter of the present application.

Applying the inventional method on a situation sketched out above the improvements in performance both in central and remote operation are achieved when islands, as described above are extracted from the central computer that owns the workflow model of the complete insurance application. At the central location the extracted workflow model can optionally also be optimized towards improved performance and responsiveness of the dialogs. The extracted model with the required data objects, as are client objects, policy objects and claim objects, can be loaded to the centrally or remotely connected workstation. Then the workstation can be disconnected from the central computer, and the activities in the extracted workflow can be executed with the help of a workflow interpreter that has also been loaded to the workstation. Only when the agent's work on a policy or claim is completed, he can then resubmit and consolidate the updated data to the central computer and data containers via the data ports of the islands and the corresponding shadow data ports. Appropriate locking mechanisms which are state-of-the-art technology have to be employed for assuring that those data currently under the control of one specific agent can not be simultaneously changed by other users of the system. During disconnected operation on a workstation there does not exist any dependency on the properties of a remote or in-house communication link between workstation and central computer.

Figure 6:
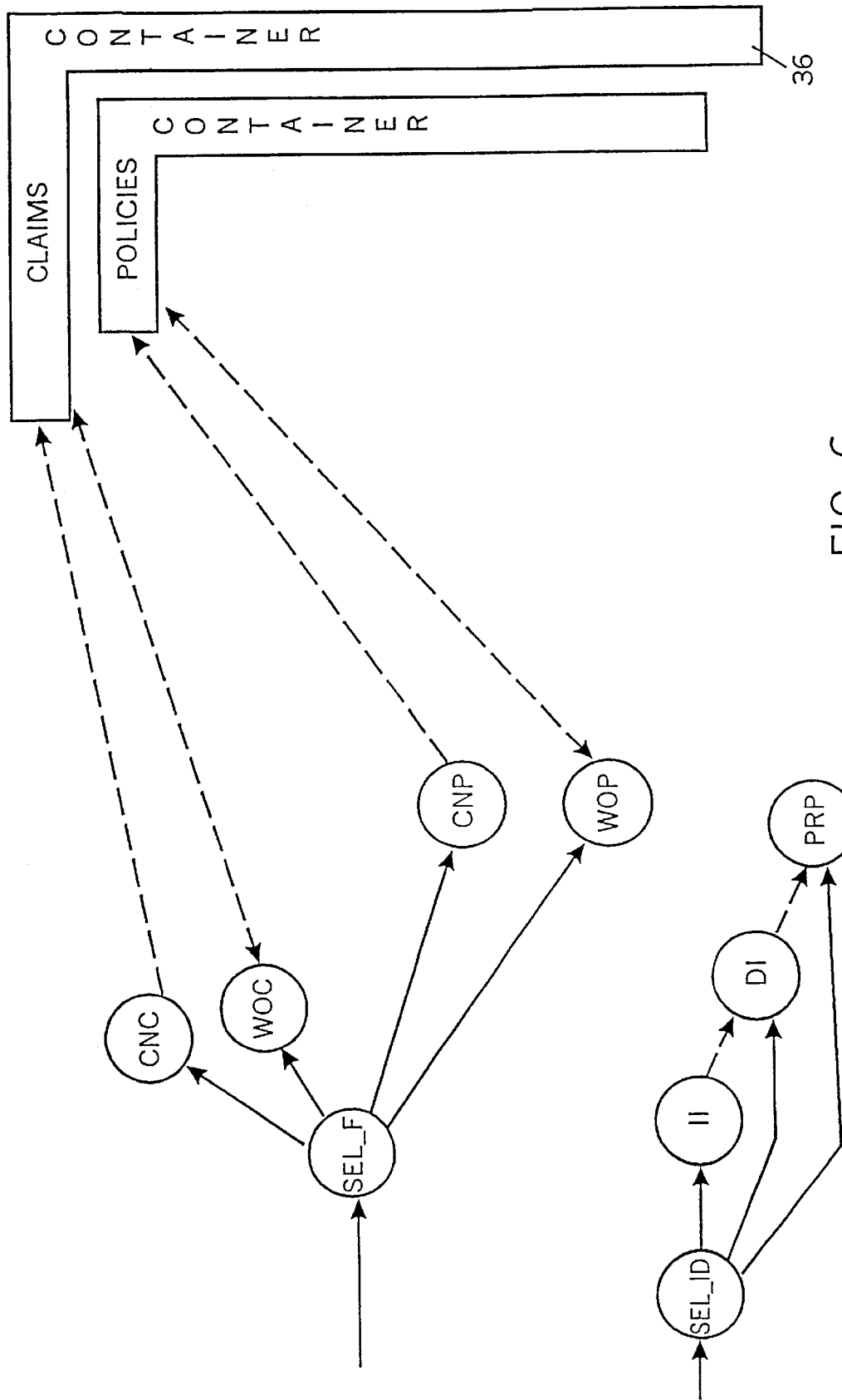
FIG. 6 is a schematic representation of a part of control and data flow in an exemplary business process according to state-of-the-art technology.
Figure 7:
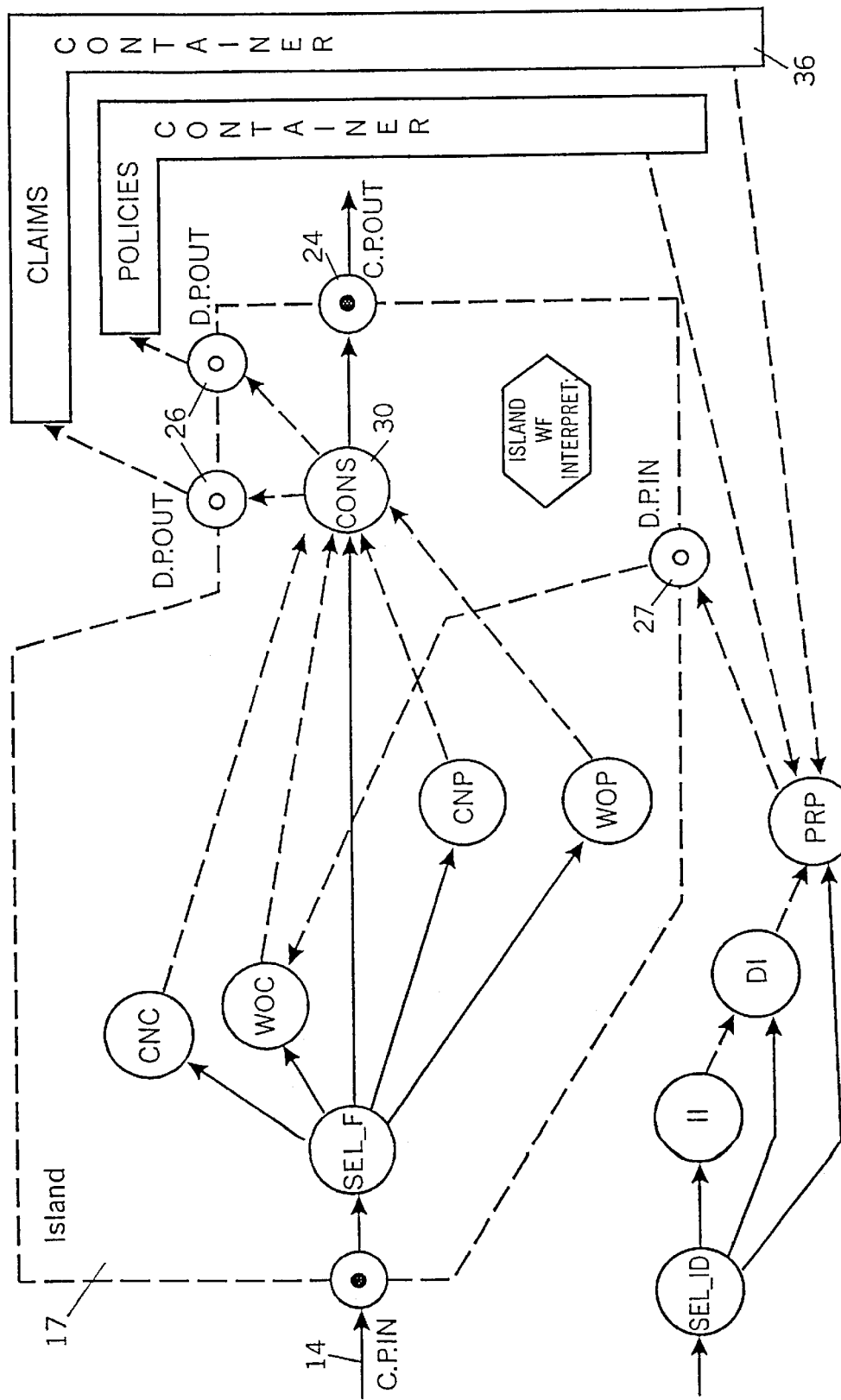
FIG. 7 is a schematic representation of control and data flows in the same process as depicted in FIG. 6, applying the method according to the present invention.

Next, with reference to FIGS. 5, 6 and 7 a set of workflow oriented activities and involved data objects that are required to demonstrate the essential functions and properties according to the present invention are presented as they appear in the context with the insurance agent example. Any of the 'base' activities presented next below may themselves encompass 'complex' activities that are again expressible in workflow diagrams. In other words, the method according to the invention is extendible to be performed in a recursive manner. But wherever such a complex activity can be executed in one single workstation context, local or. remote, the description of all functional details is suppressed in order to concentrate on the essentials of the present invention.

The base activities introduced here are presented for a better conciseness in a COBOL—like metalanguage. For one of these activities—work on claims—(WOC) it is shown in FIG. 5 how the activity could be represented in the interactive dialogs of a workstation. In the window, depicted in FIG. 5 the basic data for any working on claims are entered or displayed, respectively, as are the client name, the policy number and the claim number.

Several activities have to be performed while the workstation is still logically connected to the central computer, preparing for subsequent disconnected operation. These preparatory activities serve for identifying islands for the use of individual users of workstations, and for extracting, downloading and eventually consolidating the respective insurance data objects between the central computer and a workstation.

First, the 'base' activity identify_island(new_island_name(island-id), create_new_pol icy, create_new_claim, work_on_policy, work_on_claim) is presented.

This activity -abbreviated as II in the drawings -identifies the set of sub-activities that have to be enabled for execution in the disconnected mode in an activity island. The activities from the central workflow must be selected into an island 17 in such a way that only one control connector 14 enters said island. Control connectors are represented by directed, full lines, data connectors by directed broken lines. Additional activities that are enabled by default in any isolatable island need not be explicitly specified in II.

Next, the 'base' activity download_island(agent(agent-id), island name(island-id)) -abbreviated with DI- downloads a previously identified island 17 to the workstation of a specific insurance agent. This downloading has to be requested by the agent while he is still connected to the central computer. Downloading creates a local sub-workflow model, i.e. a workflow island for all activities to be performed on the personal workstation, and initializes the shadow ports for the island on the central computer and the ports on the workstation with placeholders for insurance object data to be requested. In a general solution not addressed in the current example, also multiple islands can be defined and downloaded to one workstation.

Next, the base activity prepare_remote_portfolio(agent (agent-id), island_name (island-id), policy_list[client-name, policy-#], claim_list[client-name, policy-#, claim-#])-abbreviated as PRP is performed by an agent for establishing which list of policies and which list of claims he wants to work on in the 'isolated mode' in an identified island, ensuring that the set of policies and claims is downloaded to the respective shadow ports on the central computer and from there communicated to the ports of his personal workstation. The brackets [ ] indicate a list of parameter values for the activity.

When this operation has been performed successfully, the agent can now logically and physically disconnect his workstation from the central computer and start to work on this set, independent of any local or, where applicable, remote connection to the insurance central computer. The result of this operation is the priming of the 'input object data ports' 27 -abbreviated as D_P_IN- of the workstation with all those data which have been specified in the activity parameters.

The agent can perform this activity multiple times against an already downloaded island, updating or extending the set of data objects downloaded to the workstation.

Next, the base activity disconnect_island(island_name (island-id))-abbreviated as DISI- logically disconnects the workstation from the central computer and verifies that the island and data in the previously executed DI and PRP activities activity have been successfully downloaded. This activity is administrative only and not shown explicitly in the drawings.

Next, the activities which are to be performed with the island on the disconnected workstation are described in more detail.

These activities can be performed on an isolated island for working on downloaded data objects, and also for creating new data objects. The final effect of these activities is identical as if they were executed in a central state-of-the-art workflow.

First, the activity select_function abbreviated as: SEL_F offers the agent access to the other activities in the island, and supports also the requirement that only one single control connector may lead into an island.

The activity create_new_policy(client-name, policy-#)

abbreviated as CNP is executed for creating a new policy for an identified client. Since during this activity no access to the central computer is secured, the agent will only tentatively create a new policy for the client, pending later certification of the client's credentials by the central computer. Only after this certification a valid policy will be issued and mailed to the client.

The activity create_new_claim(client-name, policy-#, claim-#
   abbreviated CNC— is executed by the agent for introducing a new claim against an existing policy for a client. As in CNP, the new claim is entered tentatively, pending later verification on the central computer and mailing to the client.

The activity work_on policy(client-name, policy-#)
   abbreviated as WOP- is executed by an agent when he wants to work on a downloaded policy towards modifications under discussion with the client. Again as above, any changes are made pending later verification at the central computer.

The activity work_on_claim(client-name, policy-#, claim-#)- abbreviated as WOC is executed by an agent if he wants to work on a previously downloaded or newly created claim with the client. Again as above, any changes or adjustments made due to the claim are made pending later verification at the central computer.

FIG. 5 shows how such an activity might be presented to the agent on his workstation. In the scrollable fields for Policies and Claims he can browse through all policies for clients and claims that either have been downloaded to, or newly created on his workstation. The arrow at the right of the value fields indicates that multiple values can be accessed by browsing.

The activity consolitdate_to_central abbreviated CTC or CONS-is executed by the agent if he wants to consolidate all activities and their resulting data to the central computer. The activity is always automatically created for an island for the purpose of consolidating or closing the island operations. For successfully executing this activity the agent must physically reconnect his workstation, either locally or remotely, to the central insurance computer. When this physical and logical connection is successfully established, the data on policies and claims from the activities executed in the island that are temporarily kept in the container of the CTC activity, are transferred to the data ports of the workstation, they are communicated from the data ports of the workstation to the shadow ports on the central computer, and after verification they are transferred to the central containers 34 and 36 for policies and claims, respectively. Only after successful verification the activity is successfully completed and terminated.

If verifications lead to inconsistencies or errors, corresponding return messages are sent back to the workstation. Return messages will be automatically transmitted if the workstation is still connected, or when the respective island or workstation becomes reconnected for the specific agent who previously issued the CTC activity.

From the CTC activity the agent can chose to exit the island, or continue with one of the data handling activities in the island.

FIG. 6 shows the central workflow diagram for the sample. application in its non-isolated form corresponding to state-of-the-art technology. From the selection function SEL_F the agent can select anyone of the activities CNC, WOC, CNP, and WOP. In each of these activities he can operate on multiple objects, browsing through lists as explained for FIG. 5.

These activities fetch and deliver the insurance object data from and to the object containers. A central workflow interpreter takes care for the interpretation of the activities executed by the user or, the agent, respectively.

The activities selectable from select_island_definition (SEL ID) are only executed if an island is to be defined and/or primed with data.

With reference to FIG. 7 the workflow diagram for the application, with the connectors for identifying, extracting and downloading islands on the central computer, as well as the workflow diagram of the island is described.

Executing the activities selectable through SEL_ID the agent can identify and download said island 17. The activity II identifies said island and specifies which activities have to be comprised by said island. This activity is still fully executed within the central computer. FIG. 6 shows the resulting island encircled by the broken line 17.

Further, the resulting island workflow diagram contains some automatically generated extending modifications of the original workflow. Thus, an activity CONS 30 as described above is automatically inserted into the workflow diagram. All data connectors originally leading directly from the activities to the data containers are routed to the CONS activity. From there data connectors lead to the outgoing data ports 26 created for the island and to the outgoing control port 24.

All incoming data connectors are re-routed to come from an incoming data port 27 which connects to both, the WOP activity and the WOC activity. The control connector originally leading to the SEL_F activity is re-routed to pass through the incoming control port 14. The downloadable island logically also contains an island workflow interpreter that will be required to work on the island in the workstation when disconnected from the central computer. Work with the activities in the specific island is initiated from the single incoming control port 14, displaying the SEL_F activity to the agent.

For all data and control ports created for the island, corresponding shadow ports are created in the central workflow diagram. Between these central and local data and control ports eventually the control and data information will be exchanged via communication means between an island and the central computer, when disconnecting or reconnecting.

The activity DI requires that a workstation is actively connected for the agent specified in the activity. This activity transfers the encircled island 17 with the definitions of all ports to the specific workstation.

When DI is completed, the objects selected in PRP can be fetched from the central containers 34, 36 and can be transferred to the corresponding local data ports 27 of the workstation.

When this is completed, the agent can logically and physically disconnect the island and workstation from the central computer with the activity DISI which is not shown in the Figures for improved clarity thereof. Now he can, for example, physically take his workstation away and carry it to the location where he wants to perform his work.

When the agent works on his disconnected workstation, the island identified and encircled in FIG. 6 resides on his workstation, without any logical connection to the central computer. The workflow diagram for the island is interpreted by the island workflow interpreter that was physically downloaded together with the island, or was downloaded before for permanent residence on the workstation. When the island is selected by the agent, the interpreter presents him initially with the SEL_F activity, from where he can select which of the insurance related activities he wants to perform. He can work on any of the policies or claims whose data have been downloaded to his workstation, and he can create new policies and claims.

When an agent has completed his work, or a major part of his work, he may chose to consolidate the results with the central computer and containers, executing the CONS activity. He must secure a physical data connection from his workstation to the central computer and can then execute the CONS activity. This activity will load all locally created or modified data to the local data ports and will then communicate the data to the corresponding central shadow data ports as shortly outlined above. From there the data will be automatically verified by a data consistency check function of the central workflow interpreter, and will then be transferred to the central containers. Where necessary, as described above, messages will be sent back to the workstation holding the island.

After a successful consolidation activity the central computer is updated in a way that the agent can now chose to physically disconnect his workstation from the central computer. He can now decide either to terminate his work on the workstation, or continue to work on the island, requiring again a later execution of a CONS activity.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by letters patent is:

1. A method for improving workflow in workflow management systems controlling business processes in a distributed application across a networked computer system comprising at least one server holding application data for use by a plurality of user assigned workstations, in which workflow management system each user has to perform activities as a part of the workflow, said method comprising the steps of analyzing (110) workflow related information at the server for detecting islands (17) in the workflow, said islands (17) being a part of the workflow formed by an aggregation of activities (43,44,45) (i) associated with the same logical location attribute (18), or a pair of specified logical and physical location attributes (18, 20) and (ii) the same user-id attribute (22), recognizing (120) islands automatically by using a list of criteria being at least partly derivable from a workflow graph, wherein each of the islands has sufficient information to allow the workstations to perform all of the activities of the island, while the workstations are disconnected from the server, encapsulating (130) said recognized islands including the step of creating control ports and data ports, for each island, for control connectors and data connectors to and from the island, said ports serving as information buffers between the island and the rest of the workflow to facilitate performing the activities of the island by a workstation that is disconnected from the server, and performing (140) activities in the encapsulated islands (43,44,45) in an encapsulated form.

2. The method according to claim 1, wherein after encapsulating downloading the islands (17) and the data required to initialize the data ports (26)to a remote client workstation, performing island activities (43,44, 45) on said remote client workstation, uploading data gained by said performing step to the central server.

3. The method according to claim 2, further comprising the steps of after downloading disconnecting said remote client workstation from the central server before performing said island activities (43,44,45), reconnecting said remote client workstation to the central server after performing said island activities (43,44,45) on said remote client workstation.

4. The method according to claim 1, further comprising the step of:

using a client, of the server as a sub-server for a further associated sub-client, whereby said island's activities are distributed on said clients and sub-clients.

5. A networked computer system forming part of the hardware of a workflow management system controlling a distributed application comprising at least one server holding application data for use by a plurality of user assigned workstations, in which workflow management system each user has to perform activities as a part of the workflow, said computer system comprising means for analyzing workflow related information at the server for detecting islands (17) in the workflow, said islands being a part of the workflow formed by an aggregation of activities (43,44,45) (i) associated with the same logical location attribute (18), or a pair of specified logical and physical location attributes (18, 20) and (ii) the same user-id attribute (22), means for recognizing islands (17) automatically by using a list of criteria being at least partly derivable from a workflow graph, wherein each of the islands has sufficient information to allow the workstations to perform all of the activities of the island, while the workstations are disconnected from the server, means for encapsulating said recognized islands, including the means of creating control ports and data ports, for each island, for control connectors and data connectors to and from the island, said ports serving as information buffers between the island and the rest of the workflow to facilitate performing the activities of the island by a workstation that is disconnected from the server, and means for performing activities in the encapsulated islands (43,44,45) in an encapsulated form.

6. The computer system according to claim 5, further comprising means for downloading the encapsulated islands (17) and the data required to initialize the data ports (26) to a remote client workstation, the performing means includes means for performing island activities (43,44,45) on said remote client workstation, means for uploading data gained by said performing step (140) to the central server.

7. The computer system according to claim 6, further comprising means for disconnecting said remote client workstation from the central server before performing said island activities (43,44,45), means for reconnecting said remote client workstation to the central server after performing said island activities (43,44,45) on said remote client workstation.

8. The computer system according to claim 5, further comprising:

means for using a client (46) of the server as a sub-server for a further associated sub-client (47), whereby said island's activities (43,44,45) are distributed on said clients (46) and sub-clients (47).

9. A computer program product comprising a workflow definition tool including a computer usable medium having computer readable program code means embodied therein for developing a workflow management system controlling a distributed application in a networked computer system comprising at least one server holding application data for use by a plurality of user assigned workstations, in which workflow management system each user has to perform activities as a part of the workflow, the computer readable program code means in said computer program product comprising computer readable program code means for causing a computer to effect the method steps of:

analyzing (110) workflow related information from a business model for detecting islands (17) in the workflow, said islands being a part of the workflow formed by an aggregation of activities (i) associated with the same logical location attribute (18), or a pair of specified logical and physical location attributes (18,20) and (ii) the same user-id attribute (22), recognizing (120) islands automatically by using a list of criteria being at least partly derivable from a workflow graph, wherein each of the islands has sufficient information to allow the workstations to perform all of the activities of the island, while the workstations are disconnected from the server, encapsulating the recognized islands, including the step of creating control ports and data ports, for each island, for control connectors and data connectors to and from the island, said ports serving as information buffers between the island and the rest of the workflow to facilitate performing the activities of the island by a workstation that is disconnected from the server, and providing an interface means for outputting island definition information to another workflow management tool of a developer postponed in the workflow management's development chain of the workflow management.

10. A workflow management system run-time computer program module storing a computer program readable by machine, tangibly embodying a program of instructions executable by the machine to perform method steps for improving workflow in workflow management systems controlling business processes in a distributed application across a networked computer system comprising at least one server holding application data for use by a plurality of user assigned workstations, in which workflow management system each user has to perform activities as a part of the workflow, said method steps comprising:

analyzing (110) workflow related information at the server for detecting islands (17) in the workflow, said islands (17) being a part of the workflow formed by an aggregation of activities (43,44,45) (i) associated with the same logical location attribute (18), or a pair of specified logical and physical location attributes (18, 20) and (ii) the same user-id attribute (22), recognizing (120) islands automatically by using a list of criteria being at least partly derivable from a workflow graph, wherein each of the islands has sufficient information to allow the workstations to perform all of the activities of the island while the workstations are disconnected from the server, encapsulating (130) said recognized islands including the step of creating control ports and data ports, for each island, for control connectors and data connectors to and from the island, said ports serving as information buffers between the island and the rest of the workflow to facilitate performing the activities of the island by a workstation that is disconnected from the server, and performing (140) activities in the encapsulated islands (43,44,45) in an encapsulated form.

* * * * *

UNITED STATES PATENT AND TRADEMARK OFFICE
CERTIFICATE OF CORRECTION

PATENT NO. : 6,816,902 B1
DATED : November 9, 2004
INVENTOR(S) : Bandat et al.

It is certified that error appears in the above-identified patent and that said Letters Patent is hereby corrected as shown below:

Column 5,
Line 41, "th same" should be -- the same --

Column 10,
Line 65, "abbreviated as CNP" should be -- -abbreviated as CNP --

Column 11,
Line 6, "create_new_claim(client-name, policy-#, claim-#" should be
-- create_new_claim(client-name, policy-#, claim-#) --
Line 7, "abbreviated CNC- is executed" should be -- -abbreviated CNC-is executed --
Line 14, "work_on policy(client-name, policy-#)" should be -- work_on _policy(client-name, policy-#) --
Line 15, "abbreviated as WOP-" should be -- -abbreviated as WOP- --
Line 50, "and after verification" should be -- and after automatic verification --
Line 64, "sample. application" should be -- sample application --

Column 12,
Line 8, "(SEL ID)" should be -- (SEL_ID) --

Signed and Sealed this

Twenty-first Day of June, 2005

JON W. DUDAS
*Director of the United States Patent and Trademark Office*